US006750442B2

(12) United States Patent
Bala et al.

(10) Patent No.: US 6,750,442 B2
(45) Date of Patent: Jun. 15, 2004

(54) USE OF SPECTRAL SENSORS FOR AUTOMATIC MEDIA IDENTIFICATION AND IMPROVED SCANNER CORRECTION

(75) Inventors: Raja Bala, Webster, NY (US); Lalit K. Mestha, Fairport, NY (US); Robert J. Rolleston, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/093,220

(22) Filed: Mar. 6, 2002

(65) Prior Publication Data

US 2003/0168582 A1 Sep. 11, 2003

(51) Int. Cl.[7] .................................................. G01J 3/50
(52) U.S. Cl. ....................................... 250/226; 250/234
(58) Field of Search ............................... 250/226, 234; 356/407, 406, 405, 425, 303, 302; 347/232; 382/167; 430/43; 358/504, 518, 523; 399/39, 54

(56) References Cited

U.S. PATENT DOCUMENTS

| 5,137,364 | A | | 8/1992 | McCarthy ................... 356/402 |
|---|---|---|---|---|
| 5,272,518 | A | | 12/1993 | Vincent ...................... 356/405 |
| 5,450,165 | A | | 9/1995 | Henderson .................. 355/208 |
| 5,481,380 | A | | 1/1996 | Bestmann ................... 358/504 |
| 5,668,596 | A | * | 9/1997 | Vogel ...................... 346/222.1 |
| 5,671,059 | A | | 9/1997 | Vincent ...................... 356/402 |
| 5,739,927 | A | | 4/1998 | Balasubramanian et al. ..... 358/518 |
| 5,748,221 | A | | 5/1998 | Castelli et al. ............... 347/232 |
| 5,754,682 | A | * | 5/1998 | Katoh ........................ 382/162 |
| 5,793,884 | A | | 8/1998 | Farrell ....................... 382/167 |
| 5,838,451 | A | | 11/1998 | McCarthy ................... 356/406 |
| 5,844,680 | A | | 12/1998 | Sperling ..................... 356/303 |
| 5,963,333 | A | | 10/1999 | Walowit et al. ............. 356/425 |
| 6,020,583 | A | | 2/2000 | Walowit et al. ............. 250/226 |
| 6,047,143 | A | | 4/2000 | Larson et al. .................. 399/29 |
| 6,147,761 | A | | 11/2000 | Walowit et al. ............. 356/425 |
| 6,157,454 | A | | 12/2000 | Wagner et al. .............. 356/407 |
| 6,249,346 | B1 | | 6/2001 | Chen et al. .................. 356/328 |

\* cited by examiner

*Primary Examiner*—Thanh X. Luu
*Assistant Examiner*—Seung C Sohn
(74) *Attorney, Agent, or Firm*—Perman & Green, LLP (57) ABSTRACT

An image transfer apparatus with a scanner and a spectrophotometric sensor interacting logically with the scanner. When the scanner scans a medium containing a color image, the spectrophotometric sensor interacts with the scanner to aid in the automatic selection of a scanner color correction corresponding to the medium being scanned.

34 Claims, 9 Drawing Sheets

FIG. 9

USE OF SPECTRAL SENSORS FOR AUTOMATIC MEDIA IDENTIFICATION AND IMPROVED SCANNER CORRECTION

BACKGROUND OF THE INVENTION

1. Field of the Invention

The present invention relates generally to a reproduction technique, and specifically to a method and apparatus for using spectral sensors for media identification and improved scanner correction.

2. Brief Description of Related Developments

Color correction for scanners is a problem in color management systems. Scanners sense color in a different way than the human visual system, hence technology is needed that relates scanner signals and colorimetric (i.e. visual) signals. Scanners are deviant from the human visual system in ways that differ depending on the spectral characteristics of the medium (i.e. substrate and inks, or a live scene) being scanned. To address this problem, different characterizations, or scanner profiles are built for different media. In conventional scanners this may be accomplished by scanning in a scanner target containing patches with known colorimetric values of those patches measured by a reference spectrophotometer, extracting the scanner red, green and blue (RGB) signals for each of the patches, and building a profile that maps scanner RGB to a colorimetric space. This process is repeated for each different medium. Two problems exist with such a solution.

First, the aforementioned method leaves the user with the burden of selecting the correct profile for processing a given scan. In a recent study, over half of users asked to identify the medium by examining prints from photographic, offset, and inkjet printers were not able to do so correctly. Considerable error arises from choosing the incorrect scanner profile.

Second, even when the correct profile is chosen, there can be sufficient variation in input materials within a given media class to give rise to objectionable errors in scanner color correction. An example of the latter, if the medium is known to be photographic, the scanner's response can change considerably depending on the manufacturer of the medium, (e.g. Kodak vs. Fuji), and can vary from batch to batch within the same manufacturer.

U.S. Pat. No. 5,450,165 discloses one method to measure the optical density of toner on a photoreceptor in areas where the color separated image has constant pixel values at least as large as the aperture of the sensing system. This method correlates areas with pre-existing image data 'incidental test patches' for print quality measurements. The incidental test patches are predetermined from the stored image file and printed by the system.

U.S. Pat. No. 5,481,380 discloses a method of scanner calibration where a test target containing patches of known colorimetric values is scanned, the resulting scanner RGB values are transformed into estimates of colorimetric values using a simple scanner model, and the estimates are then refined with the known measurements. Since this approach only derives the correction based on a factory installed test target, and does not adjust the correction for each input scan, the technique does not address either of the aforementioned problems.

Using the approach in U.S. Pat. No. 5,481,380, the user can read different test targets for different print samples (i.e. test target #1 for lithographic print, test target #2 for xerographic print, etc.) and construct the scanner profile for prints corresponding to those matching samples. However, this will be a tedious and time consuming process for the user who has to spend time to lay down the respective test targets by identifying the printing technology of his/her document and then build the correction profile.

In order to solve these aforementioned problems the present invention automatically identifies the original is medium from which the electronic image was scanned, and thus permits a more consistent refinement of the accuracy of the color image reproduced.

SUMMARY OF THE INVENTION

The present invention is a device correction method and apparatus for color correcting a scanned electronic image.

The first embodiment is an image scanning apparatus that comprises a scanner and a spectrophotometric sensor that interacts logically with the scanner. The scanner scans a medium containing a color image, and the spectrophotometric sensor interacts with the scanner to aid in the automatic selection of a scanner color correction profile corresponding to the medium being scanned.

The second embodiment is an image scanning apparatus that comprises a scanner having different color correction scanning profiles and a spectrophotometric sensor that interacts logically with the scanner. When the scanner scans a medium containing a color image, the spectrophotometric sensor interacts with the scanner to aid in an automatic identification and a selection of at least one color correction scanning profile corresponding to the medium and the color image on the medium being scanned.

The third embodiment is a method of color correcting a scanner for a particular medium that comprises several steps. First, the medium is scanned to produce an electronic image. Second, a set of one or more regions of interest is determined in the electronic image. Third scanned values are extracted within the regions of interest. Fourth, at least one color value measurement is performed of at least one location on the image with a sensor interacting logically with the scanning device. Fifth, a scanner color correction is derived for the medium from the at least one color value measurement.

The fourth embodiment is a method of color correcting a scanner system for a particular medium, comprising several steps. First, a scanner stores a correction image electronically in memory. Second, at least one region of interest is determined in the scanner correction image. Third, a scanner correction image is printed on a medium with a printing machine. Fourth, the medium having scanner correction image is conveyed to a document scanner for scanning the scanner correction image. Fifth, the printed correction image on the medium is scanned to produce a scanned electronic image. Sixth, scanned values are extracted in the regions of interest. Seventh, at least one color value measurement is performed of the at least one region of interest on the scanner correction image with a sensor interacting logically with the scanning device. Eighth, a scanner color correction is derived for the medium from the at least one color value measurement.

BRIEF DESCRIPTION OF THE DRAWINGS

The foregoing aspects and other features of the present invention are illustrated in the following description, taken in connection with the accompanying drawings, wherein.

DETAILED DESCRIPTION OF THE PREFERRED EMBODIMENT

Figure 1:
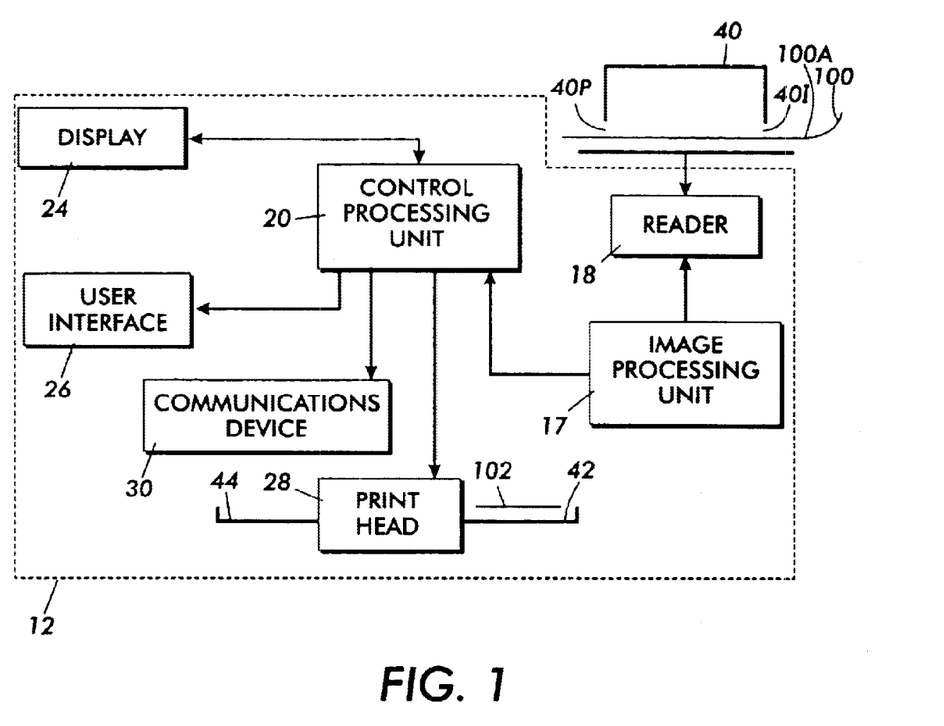
FIG. 1 is a schematic diagram of an image scanning apparatus incorporating features of the present invention.

Throughout this disclosure, the term scanner and its derivatives refer to any device that captures an electronic image from reflection prints or transparencies (e.g. flatbed or drum scanners) or live scenes (e.g. digital still or video cameras). The term medium and its derivatives is used to refer to either printed media (colorants on paper or transparency substrate) or live scenes. Referring to FIG. 1, there is shown a schematic view of an image scanning system 12 incorporating features of the present invention. Although the present invention will be described with reference to the single embodiment shown in the drawings, it should be understood that the present invention could be embodied in many alternate forms or embodiments. In addition, any suitable size, shape or type of elements or materials could be used to construct or configure those embodiments.

Still referring to FIG. 1, the image scanning apparatus 12 is shown as a stand alone device, although in alternate embodiments the apparatus may be connected to a local or wide area network or to other electronic devices by various communication lines. The image scanning apparatus 12 generally comprises a reader 18 that may contain an image processing unit (IPU) 17, a central processing unit (CPU) 20, a memory 22, a display 24 and a user interface (UI) 26. The image scanning apparatus 12 may also include a print head 28. The reader 18 is adapted to scan a printed image on a medium 100. The print head 28 is adapted to print an image on sheet medium 102. The reader 18 and print head 28 are connected so that the reader 18 can send information to the print head 28. The CPU 20 is connected to the reader 18, and the print head 28. The CPU 20 is capable of controlling the operation of the reader 18, and the print head 28, in response to commands from a user. The user enters commands via the user interface 26, which is connected to the CPU 20. The user may select the commands from a menu displayed on the display 24 of the image transfer apparatus 12, although the user commands may be input by any other suitable means. The image scanning apparatus may be a part of an image transfer apparatus 12 which may include the optional equipment of: 1) a computer printer, 2) a copier, 3) a facsimile, or 4) an optical scanner capability.

Figure 2:
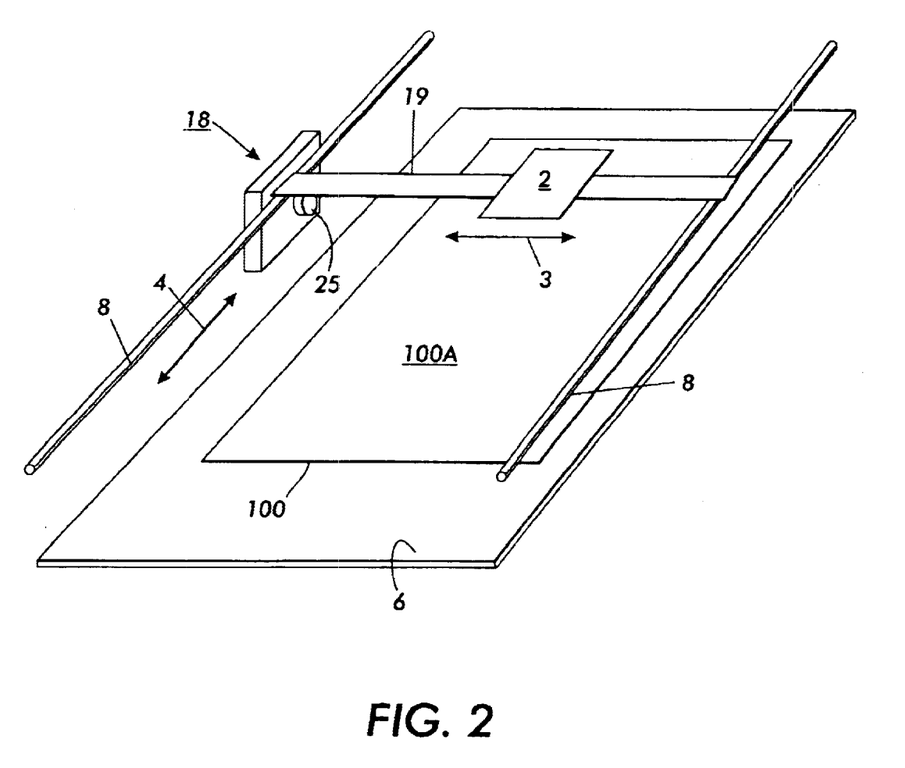
FIG. 2 is a schematic representation of a reader of the system in FIG. 1.

The reader 18 is capable of reading color images and relaying data embodying the color image via CPU 20 to the print head 28 to generate an electronic copy of a scene or an image on a sheet medium 102. The electronic data from the reader 18 may be transmitted also to a computer terminal (not shown) to form an electronic image on a display of the computer. The reader 18 may include a spectrophotometric sensor 2 (FIG. 2). For reflection or transparency scanners, the reader may also includes a scanning bar 19 (FIG. 2) for taking spectral measurements of the color image disposed on the medium 100. The measurements are used to automatically adjust the reader 18 reading the image on medium 100 as will be described below.

In particular, the reader 18 in the image scanning apparatus 12 is preferably an optical scanner, for example a scanning bar 19, capable of reading any type of image or pattern embodying information, which is disposed on the medium 100 (FIG. 2). In the preferred embodiment, the image scanning apparatus 12 has an input area 40 in which the user places the medium 100 for reading by the reader 18. The input area generally includes a platen 6 (FIG. 2) upon which the user places the medium 100 with the image face or surface 100A down. The user may place the medium 100 directly on the platen 6 or may use a roller system (not shown) within the cover 41 to feed the medium 100 to the platen 6 from an input port 40I. The reader 18 is generally located below the platen 6 of the input area 40. The reader 18 is orientated relative to the platen 6 to scan the image face 100A of the medium 100 placed against the platen 6.

As will be described in greater detail below, the reader 18 is a movable reader, which operates to optically scan the image face 100A of the medium 100 placed on the platen 6 (FIG. 2). For example, the reader 18 may travel along the length of the medium 100 while scanning laterally across the image face 100A of the medium 100.

In alternate embodiments, the device may have a static reader (not shown). This is true of digital still or video cameras. It is also true of certain types of reflection print or transparency scanners. In these cases, a roller system may transport the medium 100 from the input area 40 over the reader 18 in order for the reader 18 to read the image having any form on the medium 100. After the reader 18 has finished reading the images on the medium 100, the medium 100 can be removed manually or output by the roller system (not shown) to an output port 40P of the image scanning apparatus 12. During operation, the reader 18 converts the printed image on the medium 100 to binary encoded data which can be sent electronically, as directed by the CPU 20 to the print head 28.

The print head 28 is generally capable of receiving an image in the form of binary data and of printing the image on the medium 102. The image scanning apparatus 12 has an input area 42 for placing sheet medium 102 prior to printing. An output area 44 holds the sheet medium 102 after it is processed by the print head 28. A sheet medium transport system (not shown), such as a roller system for example, inside the image scanning apparatus 12 withdraws sheet medium 102 from the input area 42 and transports the sheet medium 102 to the print head 28. The print head 28 prints the image on the sheet medium 102 and the transport system then moves the sheet medium 102 to the output area 44 of the image scanning apparatus 12.

The CPU 20 is programmed to control the operation of the reader 18, the print head 28 and a communication device 30.

The CPU 20 controls the operational sequence of the reader 18, and print head 28 as well as the flow of data there between. For example, when the image scanning apparatus 12 is operating in a copier mode, the CPU 20 directs the reader 18 to read the image on the image face 100A of the medium 100. The CPU 20 directs the data from the reader 18 to the print head 28 and queues the print head to print the image read by the reader 18 on the sheet medium 102. Concurrent with this, the CPU 20 also operates the transport system transporting the sheet medium 102 from the input area 42 to the print head 28 and then to the output area 44 of the device. Also, the IPU 17 (FIG. 6) may be built into the reader 18 or the IPU 17 may be included in the CPU 20. The reader 18 during this pass converts the image into binary encoded data that defines an electronic image.

In greater detail now, FIG. 2 is an inverted view of one type of reader 18 suitable for use with the present invention. Preferably the reader 18, includes, two support rails 8, and an optical scanner or scanning bar 19 that holds the spectrophotometric sensor 2. The support rails 8 are longitudinal members, which extend lengthwise along the platen 6 and allow the scanning bar 19 to move, in a longitudinal direction 4. The platen 6 may be constructed of any rigid transparent material, for example glass or plastic, and it may have a variety of geometric shapes such as a flat sheet or a drum. In alternate embodiments, there may be any suitable number of rails arranged in any suitable configuration. The scanner bar 19, as seen in FIG. 2, is supported from the rails 8 to be located under the platen 6. The scanner bar 19 may include a transverse support member which is movably connected at opposite ends to the rails 8. The connection between the scanner bar 19 may include any suitable means, for moving the scanner bar back and forth along support rails 8 (as indicated by arrow 4).

Figure 3:
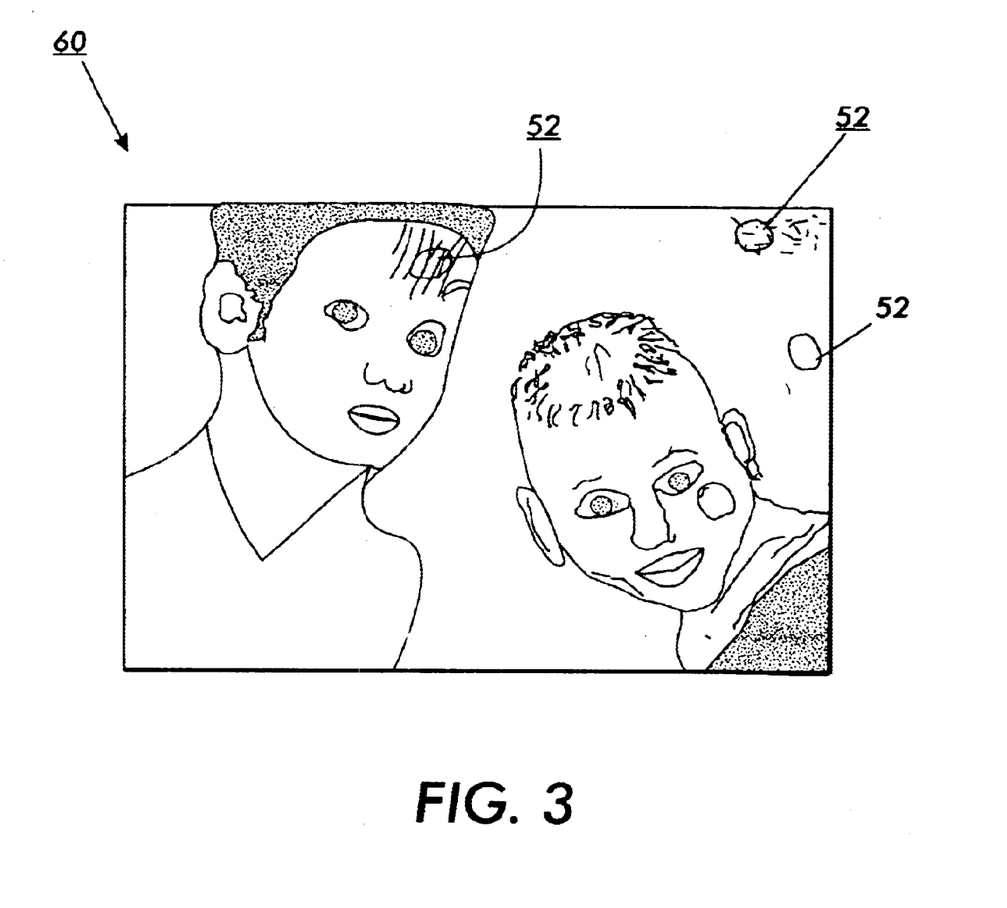
FIG. 3 is an illustration of a proto-typical image, scanned by the reader, the image having selected locations of a set of incidental test pixels.

The scanner bar 19 includes suitable optical elements for scanning the image face 100A of the medium 100 on the platen 6. The scanner bar 19 may include an image processing unit (IPU) 17. The IPU 17 may have a program to perform an initial analysis of the electronic image embodying the scanned image generated by the reader 18. The IPU 17 may have another program with scanner profiles 92. In one embodiment, the entire image 60 is scanned (FIG. 3). The IPU 17 then analyzes the image and seeks a small set of regions of interest (ROI) 52 within the image, compiles a list of ROI colors and locations, and sends the list to the sensor 2.

The reader 18 also interacts logically with a spectrophotometric sensor 2. The sensor 2 may or may not be attached physically to the scanning device. The sensor 2 is designed to emit color signals that can be related to a visually relevant color representation. The sensor 2 may consist of a variety of brands including but not limited to: Diano-Hardy, Diano Match-Scan, Hunter Association Laboratory D54, Kollmorgen MS-2000 and MS2045, or Zeiss DMC-26. The spectrophotometric sensor 2 may be connected to the scanning bar 19. In the preferred embodiment the sensor 2 moves in the lateral direction 3 along the scanning bar 19 as the scanning bar 19 moves longitudinally 4 along guide rails 8 (as indicated by arrows 3 and 4). The mobility of the reader 18 as shown in FIG. 2 allows the sensor 2 to be moved to any location along the platen 6.

There are a wide variety of mechanisms that can position the sensor 2 at the appropriate location within the image. For example, in a platen-based scanner, first the scanning bar 19 can be moved longitudinally and second the sensor 2 can be moved laterally over the entire platen 6. In the main embodiment, the spectrophotometric sensor 2 can operate with a servomotor 25 attached to the scanning bar 19, as shown in FIG. 2. One embodiment may include a spectrophotometric sensor 2 built inside of the scanning bar 19. In another embodiment the scanning bar 19 could be in the form of a handheld wand to use to manually cover the medium 100. In yet another embodiment the reader 18 and a sensor 2 view the entire area of the medium 100 at the same time without being moved. An example of this is where the reader is a digital still camera, and the sensor 2 can be optically focused at the desired location.

Figure 4:
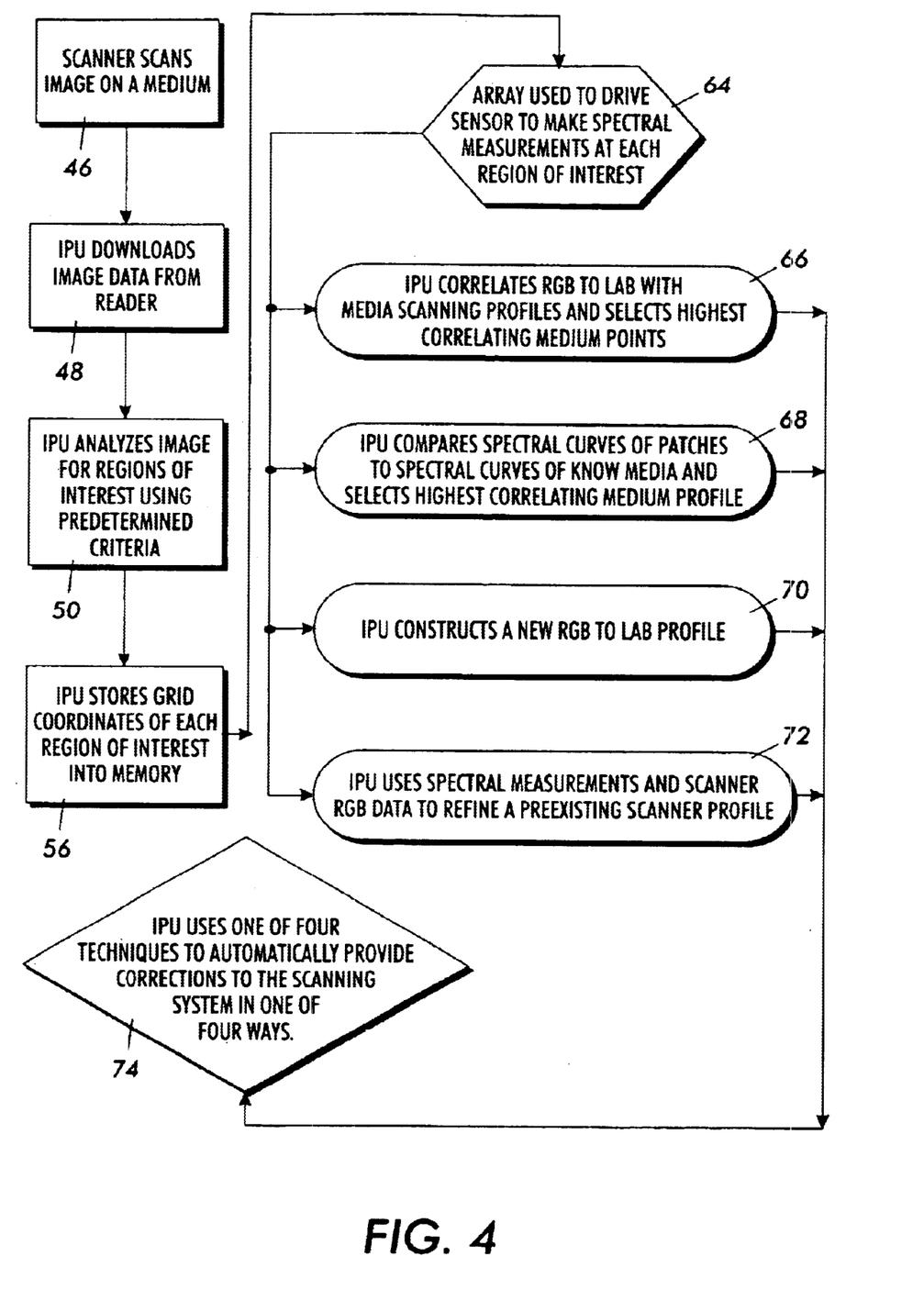
FIG. 4 is a flow chart illustrating the method for selection of a scanner characterization profile in the image scanning system.

The function of the spectrophotometric sensor 2 is to make color measurements of the image 60 that can be related to visual color representations such as CIELAB (FIG. 3). The color measurements are processed by the IPU 17 and used to automatically identify the medium 100 being read or scanned (FIG. 4). Also IPU 17 is used to select, refine, or construct RGB to L*a*b* profiles using the scanner RGB values and the colorimetric values measured by sensor 2.

The sensor 2 may include an electro-optical element for registering or sensing the spectral reflection from a color image and generating a colorimetric measurement therefrom. The electro-optical element has an aperture of predetermined size. Any typical spectral reflection measurement device measures the reflectance of an illuminated object of interest over many light wavelengths, to substantially cover the visible color spectrum or wavelength range. From these spectral measurements, it is possible to derive colorimetric values such as CIELAB, that represent visual perception of color under specific viewing conditions. Examples of the construction or design of various other color spectrophotometers are disclosed in: Xerox Corp. U.S. Pat. No. 5,748,221, and the cross-referenced U.S. application Ser. No. 09/535,007, filed Mar. 23, 2000 by Fred F. Hubble, III and Joel A. Kubby; U.S. Pat. No. 6,249,346 issued Jun. 19, 2001, noted HP U.S. Pat. No. 5,671,059, issued Sep. 23, 1997; and HP U.S. Pat. No. 5,272,518, issued Dec. 21, 1993; Accuracy Microsensor, Inc. U.S. Pat. Nos. 5,838,451 and 5,137,364, both issued to Cornelius J. McCarthy on Nov. 17, 1998 and Aug. 11, 1992, respectively; Color Savvy U.S. Pat. Nos. 6,147,761, 6,020,583, and 5,963,333; BYK-Gardner U.S. Pat. No. 5,844,680; and Colorimeter U.S. Pat. No. 6,157,454.

The medium 100 may be a live scene. The medium 100 may also be constructed of paper, plastic, Mylar, or any other suitable medium material. The medium 100 may also be coated with coatings such as inks, dyes or any other image forming substances.

FIG. 4 is a flowchart that illustrates one embodiment of the method of operation of the apparatus in order to correct a scanned image. The medium 100 is placed on the platen 6 to be held in place. The apparatus is activated, and the reader 18 passes over the platen 6 to scan the image on the medium 100 in step 46. In order to perform this step 46, the reader 18 may engage the IPU 17. The reader during this pass converts the image into binary encoded data that defines an electronic image. The IPU 17 then downloads the image data from the reader 18, in step 48.

After downloading, the IPU 17 automatically analyzes the image 60 for regions of interest (ROI) 52 using a set of predetermined criteria 77 (FIG. 5) in step 50 (FIG. 4). The IPU 17 analyzes the electronic data embodying the image 60 generated by the reader 18; to identify a number of (e.g. 10) ROI's 52 on the image 60 on the medium 100. The IPU 17 has a criteria program 77 to select the ROI 52 on the basis of at least one criterion 77. One example of a criterion is that each ROI 52 selected has smoothly varying colors (1) 77.

Figure 5:
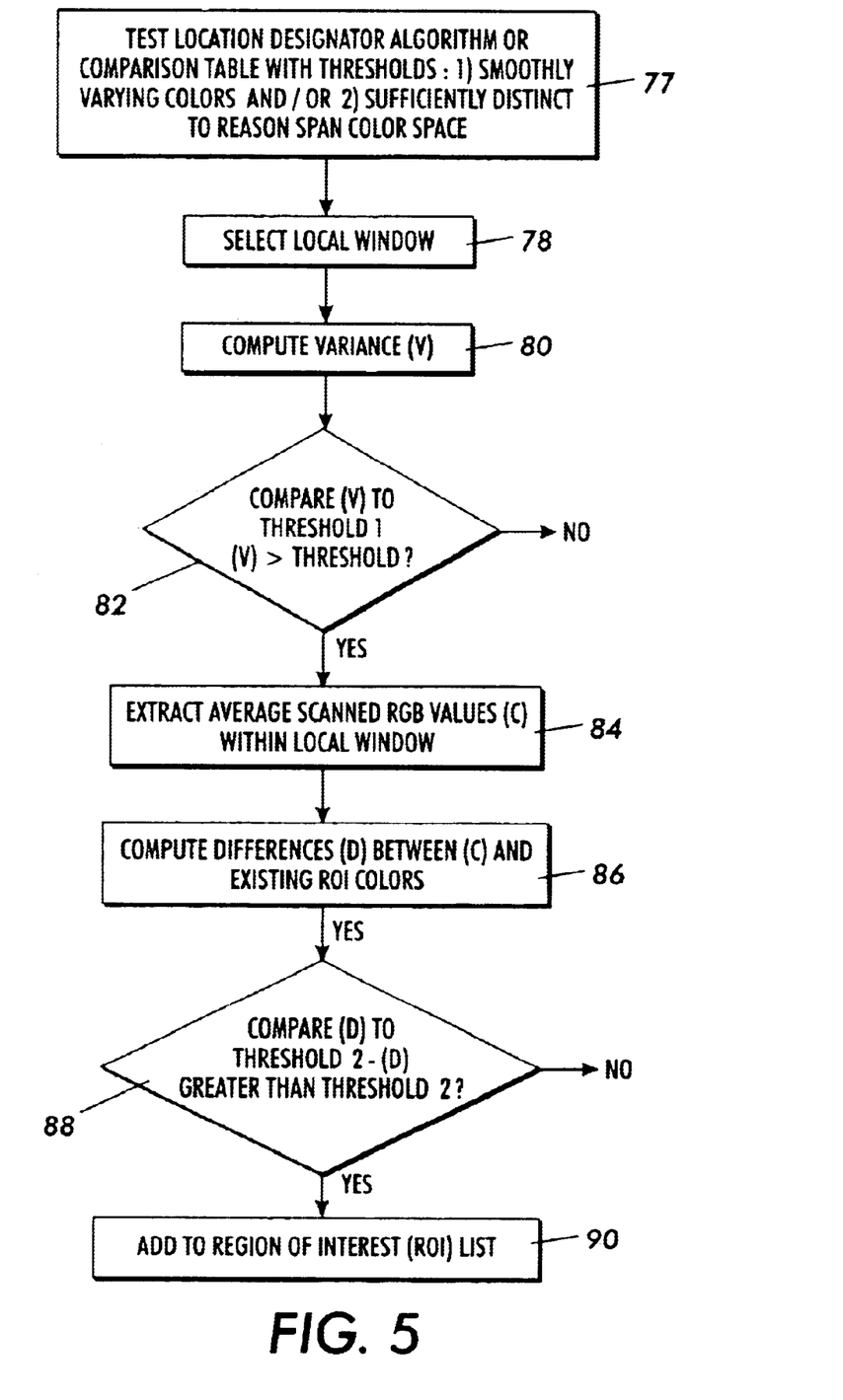
FIG. 5 is a flow diagram illustrating the process of selecting regions of interest

This criterion (1) can be evaluated by determining the variance 80 of scanned pixel values within a local window 78 in the image 60. The local window 78 size and shape are chosen based on the aperture of the color sensor, which requires data from the scanner resolution. The variance 80 is compared to a predetermined threshold (1) 77; if the variance 80 is less than the threshold 82, this ROI 52 is said to contain smoothly varying colors (1). In this case, a representative color within the local window 84, such as the average color, and the center location within the local window 78 are added to the list of ROIs 90.

A second example of a criterion 77 is that the ROI 52 colors are sufficiently distinct from each other that they reasonably span color space (2) in step 86. This criterion can be evaluated by computing the color difference between a representative color within the local window 84 under consideration and the representative colors within the ROIs selected thus far. One example of the representative color within a region 84 is the average color within that region. If the color differences are larger than the predetermined threshold 88, the new color is deemed sufficiently distinct from all previous selections, and the representative color and location are added to the ROI list 90. If multiple criteria are being used, different means can be used to combine them. The simplest approach is to ensure that each and every criterion (1) and (2) 77 is independently met. The criteria program 77 may be encoded in a suitable algorithm or comparison tables or in any other suitable means. The output of this program is a list of RGB pixel values and the corresponding x-y pixel coordinates, which are stored in the memory of the IPU 56, (FIG. 4).

The stored list of ROI 90 is used to drive the spectrophotometric color sensor 2, in step 64. Once the sensor 2 is centered, the sensor 2 makes spectral measurements at each ROI 52.

In another embodiment, the ROI 52 to be measured by the sensor 2 are retrieved from computer memory or a database that has been derived with a priori knowledge of the image 60 being scanned. For example, it is quite likely that the electronic version of the image 60 that was sent to the print head 28 is available. This image 60 can be used to generate an ROI list 90 and store it in a database associated with the image 60. When the image 60 is printed and then scanned by the scanning system, the appropriate ROI list 90 is then accessed from the database, and used to drive the sensor 2 to make spectral measurements at the ROIs 64. The image 60 may even explicitly contain ROIs 52 to be measured by the sensor 2. Association of the scanned image 60 with the appropriate database entry can be accomplished either manually, or via technology such as glyphs.

The spectral measurements may also provide the colorimetric CIELAB values. (Commission Internationale de l'Eclairage (CIE) 1976 L* (photometric lightness), a* (redness+greenness−, system values), and b* (yellowness+ blueness−, system values)).

Figure 6:
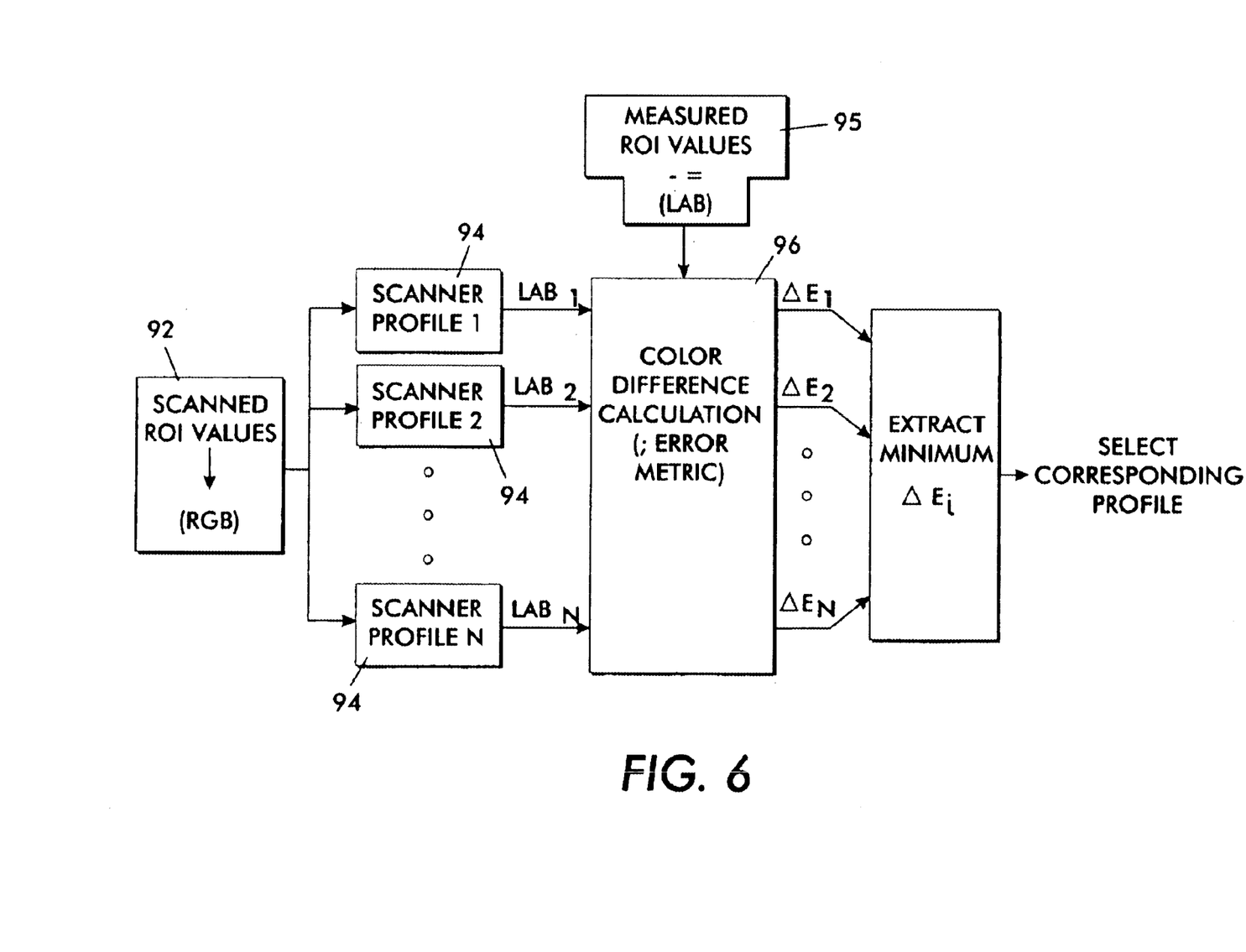
FIG. 6 is a flow diagram illustrating the process of selecting the most appropriate scanner profile for the given image by comparing data from the regions of interest with each of the available profiles.

The spectral measurements are combined with the average scanner RGB values to automatically approximate the type of medium 100 being scanned and to select, refine or derive the color correction for the particular image 60 being scanned. The automatic approximation by the IPU 17 to identify the medium 100 being scanned can be performed in a number of ways not limited to the following four alternative approaches as shown in FIG. 4, in steps 66–72:

The first approach, as shown in step 66, shown in detail in FIG. 6 would be to compare the ROI 52 RGB-LAB pairs taken from the image 60 with a set of scanner profiles built for different scenes, e.g. indoor vs outdoor scenes, or different media, e.g. photography, offset, xerography, inkjet stored, for example, in the printer/scanner CPU 20. Specifically, as shown in FIG. 6, the scanned ROI RGB values 92 are mapped through each of the profiles to obtain profile output LAB values 94. An error metric $\Delta E_i$ 96 is computed between the profile output LAB values and measured ROI LAB values 95 from the sensor 2 for the $i^{th}$ profile 2. The profile for which the minimum error value is obtained is selected for correcting the scanned image. One exemplary method of computing $\Delta E_i$ is to use the average $\Delta E^*_{ab}$.

Figure 7:
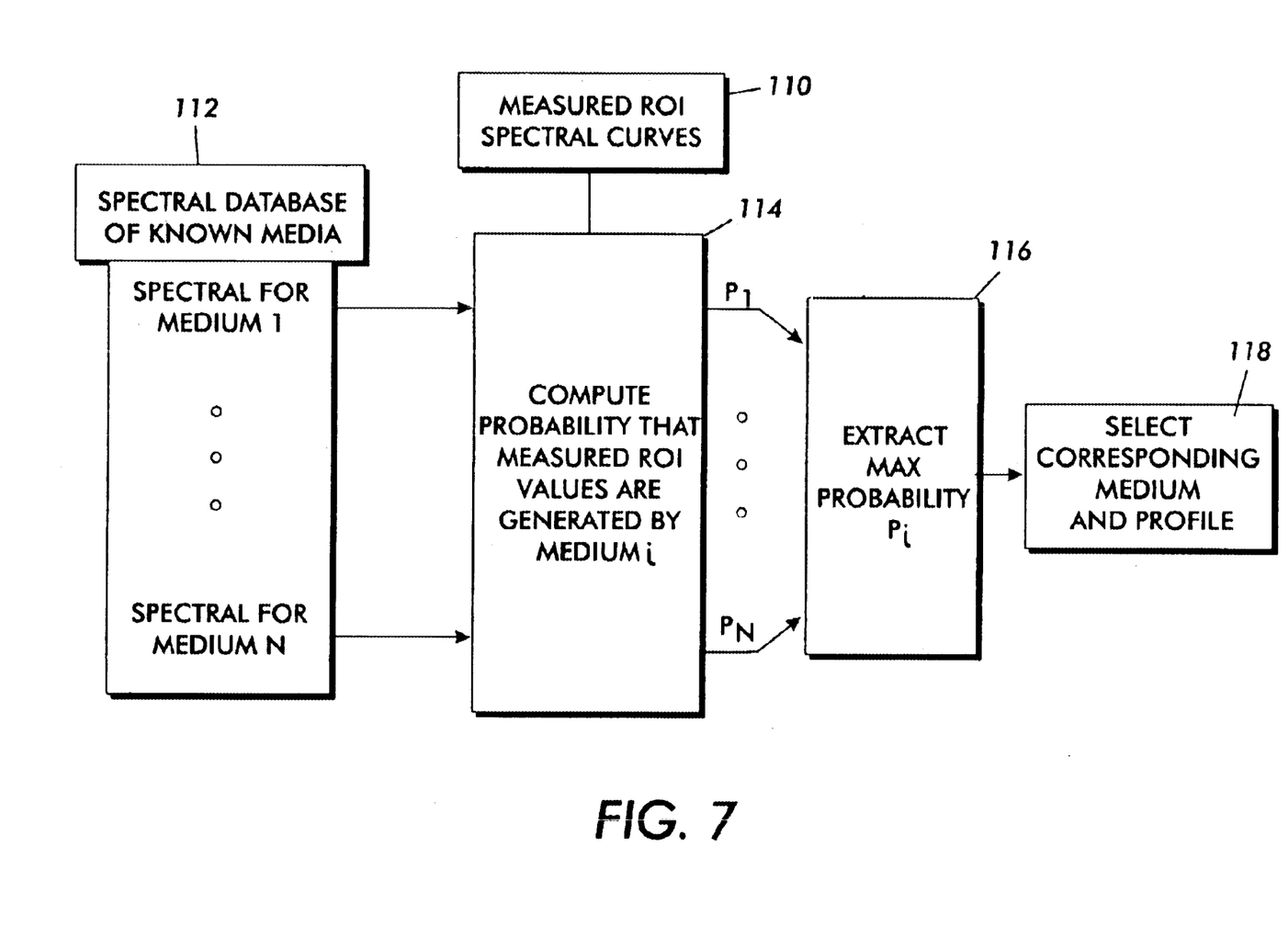
FIG. 7 is a flow diagram illustrating the process of selecting the most appropriate scanner profile for the given image by comparing spectral data from the regions of interest with a database of spectral data from different media.

The second approach, in step 68, shown in detail in FIG. 7, may be to compare the spectral reflectance curves 110 at the selected ROI 52 with a database of spectral reflectances of known media 112, and to estimate a probability that the image reflectance belongs to the set of reflectances corresponding to each medium in the database 114. The medium is then selected that has the greatest probability 116, so that the corresponding medium and profile 118 can be selected or chosen. Standard techniques in pattern recognition, such as the Mahanalobis distance classifier, can be used to estimate these probabilities. [K. Fukunaga, Introduction to statistical pattern recognition, New York: Academic Press, 1972.]

Figure 8:
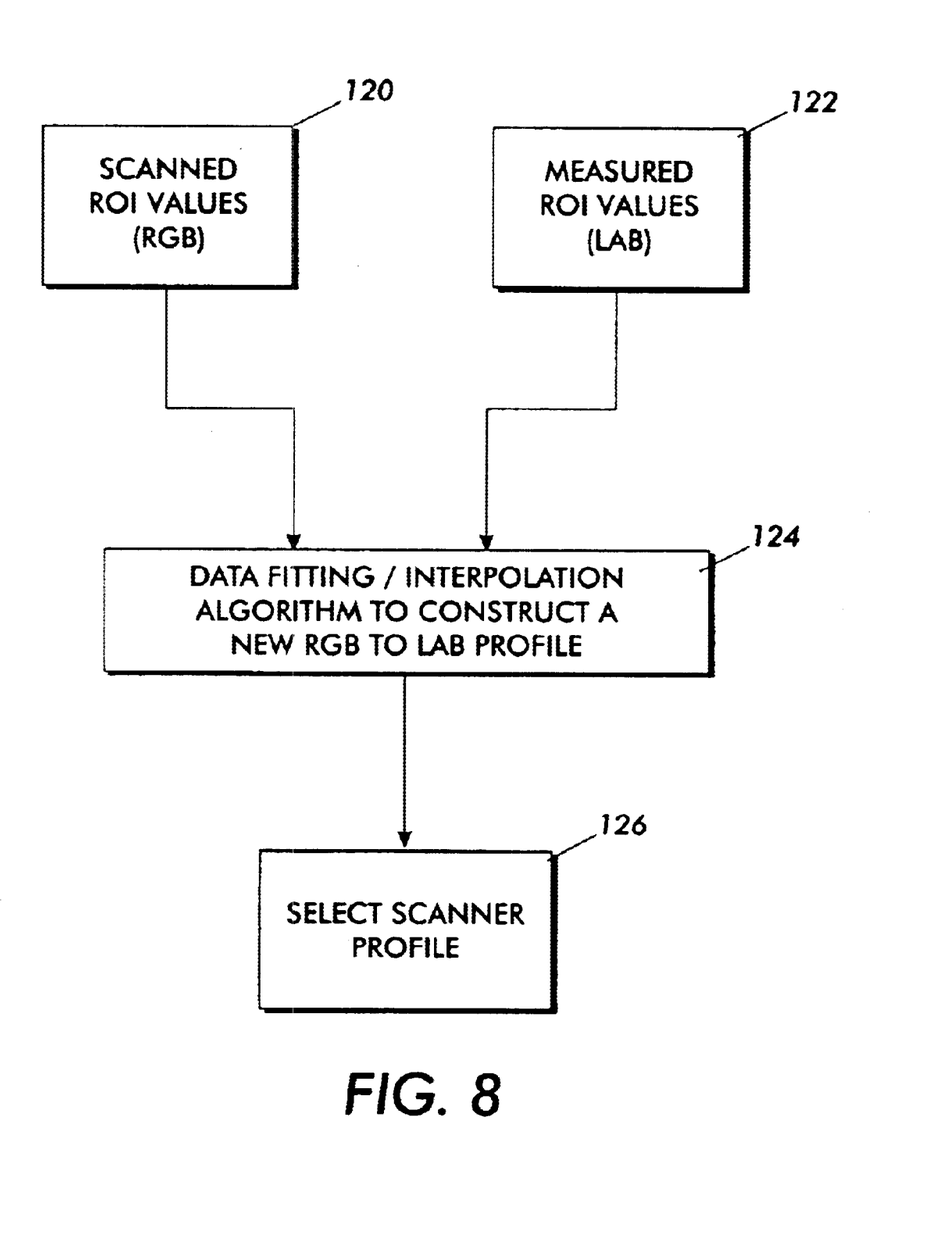
FIG. 8 is a flow diagram illustrating the process of building a scanner characterization profile using the RGB and colorimetric data from the regions of interest.

The third approach, step 70, shown in detail in FIG. 8, would be to build a new RGB-to-LAB profile, provided that the ROI 52 colors in the document are sufficiently large in number to generate the profile. A new RGB-to-LAB profile is built by combining scanned ROI values (RGB) 120 and measured ROI values (LAB) 122. The new RGB-to-LAB profile 124 is used to select a scanner profile 126. Many standard device characterization techniques can be used for building a scanner profile from RGB-LAB pairs, including neural networks [H. R. Kang, Color Technology for Electronic Imaging Devices, SPIE, Bellingham, Wash., 1997, Chapter 5.] and iterative clustered interpolation [L K. Mestha, Y R. Wang, S D Dianat, D. E. Viassolo: "Iteratively Clustered Interpolation (ICI) algorithm for geometrical interpolation of an irregularly spaced multidimensional color space", IS&T's NIP16: International Conference on Digital Printing Techniques, Oct. 15–20, 2000, Vancouver, BC. Canada.].

Figure 9:
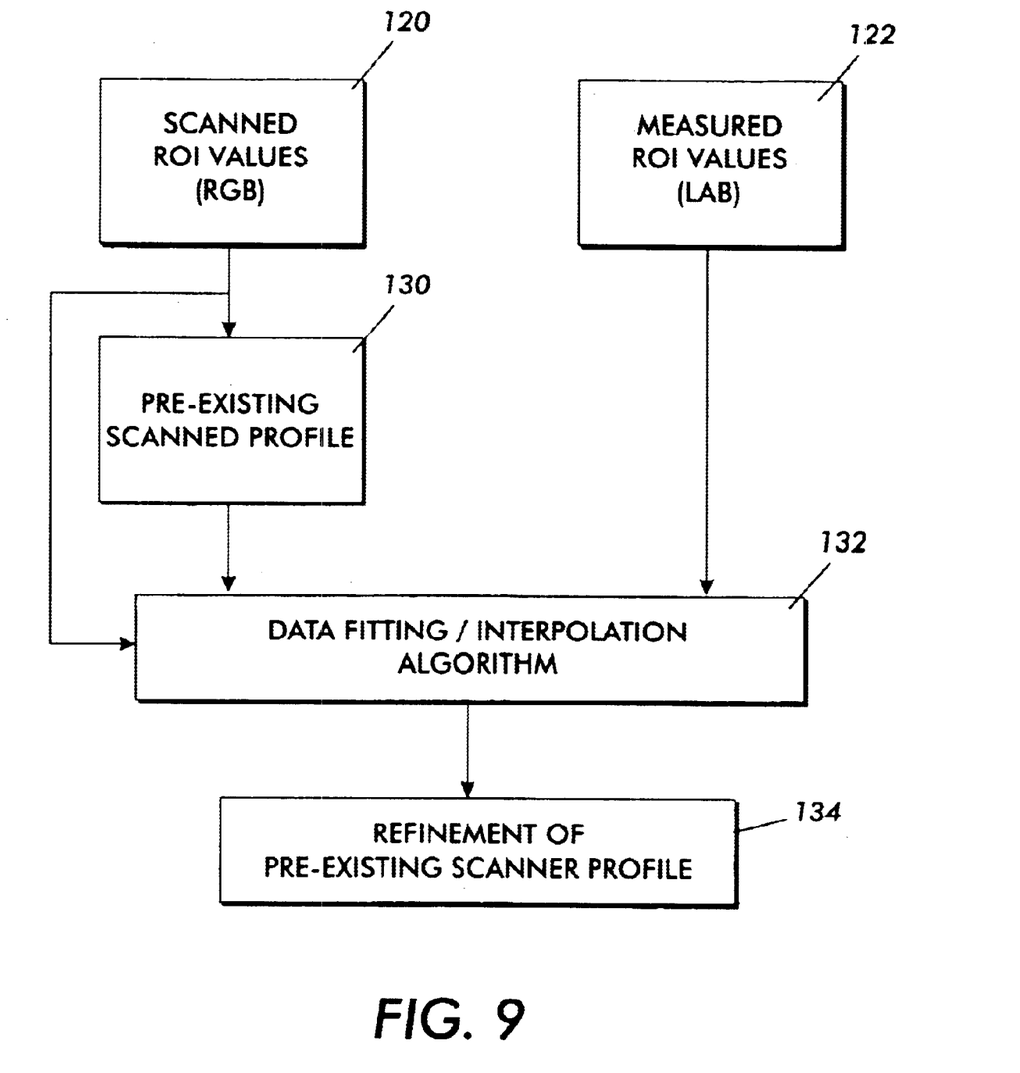
FIG. 9 is a flow diagram illustrating the process of refining a pre-existing scanner characterization profile using the RGB and colorimetric data from the regions of interest.

The fourth approach, step 72, shown in detail in FIG. 9, is to use the measured ROI values (LAB) 122 and scanned ROI values (RGB) 120 to refine a pre-existing scanner profile 130, built for a given medium.

In this instance a data fitting/interpolation algorithm 132 is used. However, refinement could be achieved through a variety of mathematical techniques that are defined by the prior art. Assume that the scanner profile comprises a 3-dimensional lookup table (LUT) that maps scanner RGB to LAB. In one exemplary approach, RGB data are extracted from the ROI RGB-LAB pairs, and processed through the 3D LUT to obtain profile LAB values. Error values are computed as the differences between the ROI LAB values and the profile LAB values. These error values are then propagated to the nodes of the 3D LUT using a distance-weighted interpolation technique such as Shepard's interpolation [R. Rolleston, Using Shepard's interpolation to build color transformation tables, IS&T/SID's $2^{nd}$ Color Imaging Conf., pp. 74–77] or distance-weighted regression [R. Balasubramanian, Refinement of printer transformations using weighted regression, Proc. SPIE, Vol 2658, pp. 334–340, (1996)].

The results of the data fitting/interpolation algorithm are then used to refine the preexisting scanner profile 134. This refinement approach addresses both user misidentification and media variation within a media class, and accounts for the media characteristics of the particular image being scanned, rather than relying upon a generic profile for a given medium.

At the conclusion of this process, the sensor 2 helps to provide color correction for scanners from the IPU 17 and at least one of the four previously described techniques 66, 68, 70, 72 automatically 74.

After the reader 18 has been operated for a period of time, the image scanning apparatus 12 may be recalibrated in order to maintain its accuracy. The recalibration is performed by measuring white spots from a tile or set of filters, with a calibration spot on the scanning platen 6. This will maintain the accuracy of the sensor 2 if an unexpected environmental condition, such as temperature, does drive the sensor optics away from the nominal limits. Recalibration of the wavelength and photometric scales is performed by a standard comparison to a white reflectance grid calibrated in terms of the perfect reflecting diffuser. One suitable method of recalibrating an image transfer system is disclosed in Systems and Methods for Determining Spectra Using Dynamic Karhunen-Loeve Algorithms with Measurements from LED Color Sensor (U.S. patent application Ser. No. 09/862,247 herein incorporated by reference).

In accordance with the present invention an image scanning method and apparatus 12 using an automatic media identification system has been developed. The reader 18 scans the medium 100 to produce an electronic image. Instead of using the optical density of the toner to correlate to pre-existing image data to identify ROIs 52 as performed in the prior art disclosed in this application, predetermined criteria are used to identify the ROIs 52. This allows for a more sensitive selection of the ROIs 52 on the image 60.

The selected ROIs 52 are then measured for spectral reflectance with the sensor 2. These measurements are used to automatically select, refine, or derive the color profile for the scanner that best suits the medium being scanned. This method eliminates the need for initial human medium selection and the subsequent potential scanner color correction errors due to sufficient variation in input materials within a given media class. The IPU 2 then directly applies a color transformation to the scanned image using the appropriate scanner profile to reproduce an electronic color-corrected image.

This method allows the user to operate the device without the consternation of misidentifying the category of medium used; this method also allows the scanning device to eliminate objectionable errors where the correct medium profile is chosen but the input materials were varied within a given media class.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. An image scanning apparatus comprising:
   a scanner for capturing color image data from an image on a medium;
   an image processing unit for selecting portions of said image according to predetermined criterion, said portions representing at least two regions of interest;
   a spectrophotometric sensor for measuring color values from each of said regions of interest and for interacting logically with said image processor to identify said medium and aid in an automatic derivation of a scanner color correction corresponding to the medium and the color image on the medium being scanned.

2. An image scanning apparatus, as described in claim 1, further comprising:
   a processor having different color correction scanning profiles; and
   wherein said spectrophotometric sensor interacts with the image data to aid in an automatic identification and a selection of at least one color correction scanning profile corresponding to the medium and the color image on the medium being scanned.

3. The apparatus according to claim 2, wherein the spectrophotometric sensor operates with a servomotor attached to a scanning bar.

4. The scanning apparatus according to claim 1, wherein the scanner is a platen-based device for scanning printed media.

5. The scanning apparatus according to claim 1, wherein the scanner operates with a drum to scan printed media.

6. The scanning apparatus according to claim 1 where the scanner is a digital still camera.

7. The scanning apparatus according to claim 1 where the scanner is a digital video camera.

8. The scanning apparatus according to claim 1, wherein the scanner is operated by a servo-motor.

9. The scanning apparatus according to claim 1, wherein the scanner contains an image processing unit.

10. A method of color correcting a scanner system for a particular medium, comprising the steps of:
    providing a medium;
    storing a scanner correction image electronically in memory;
    determining at least two regions of interest in the scanner correction image;
    printing the medium having a scanner correction image with a printing machine;
    conveying the medium having the scanner correction image to a document scanner for scanning the medium having the scanner correction image;
    scanning the printed medium having the scanner correction image to produce a scanned electronic image;
    extracting scanned values from the scanned electronic image in the regions of interest;
    performing at least one color value measurement of the at least two regions of interest on the printed medium having the scanner correction image with a sensor interacting logically with the scanning device; and
    deriving a scanner color correction for the medium from the at least one color value measurement.

11. A method of color correcting a scanner image for a particular medium, comprising the steps of:
    scanning a medium to produce an electronic image;
    processing said image in an image processor to determine a set of at least two regions of interest in the electronic image according to predetermined criterion;
    performing at least one color value measurement of the at least two regions of interest on the electronic image with a sensor interacting logically with said image processor;
    identifying the medium; and
    deriving a scanner color correction for the medium from the at least one color value measurement.

12. The method according to claim 11, wherein the step of scanning comprises capturing an electronic image of a printed medium.

13. The method according to claim 11, wherein the step of scanning comprises capturing an electronic image of a live scene.

14. The method according to claim 11, wherein the step of determining comprises:

computing a set of at least one predetermined criterion from the electronic image; and identifying a set of at least two regions of interest as having attributes that meet the set of predetermined criteria.

15. The method according to claim 14, wherein the step of computing comprises:

calculating a color variance within a local window in the scanned electronic image; and comparing the color variance with a predetermined threshold.

16. The method according to claim 14 wherein the step of computing comprises:

calculating a difference between a representative color within a local window under consideration and at least one representative color within the at least one region of interest selected thus far; and comparing the difference with the at least one predetermined threshold.

17. The method according to claim 11, wherein the step of determining comprises retrieving the at least one region of interest from a database associated with the electronic image.

18. The method according to claim 11, wherein the step of determining comprises retrieving the at least one region of interest from a computer memory.

19. The method according to claim 11 wherein the step of extracting comprises computing an average of the scanned color values within the at least one region of interest.

20. The method according to claim 11, wherein the step of performing comprises:

locating the sensor at the at least one region of interest; and measuring a color signal relating to a visual color perception.

21. The method according to claim 20 wherein the the step of locating comprises mechanically moving the sensor to a desired location.

22. The method according to claim 20 wherein the step of locating comprises optically focusing the sensor at the appropriate location.

23. The method according to claim 20 wherein the step of measuring comprises extracting spectral reflectance signals.

24. The method according to claim 20, wherein the step of measuring comprises extracting CIELAB values.

25. The method according to claim 11, wherein the step of identifying comprises:

comparing the at least one measured color value to a database of at least one scanner characterization profile for different media to find the at least one scanner characterization profile having a minimum error metric between the at least one measured color value and the output of the at least one scanner characterization profile in the database;

identifying the medium associated with the database of at least one scanner characterization profile; and selecting the at least one scanner characterization profile from the database of scanner the at least one characterization profile for correcting the electronic image.

26. The method according to claim 25, wherein the minimum error metric is an average $\Delta E^*_{ab}$ error between a profile output value and a measured value at the at least one region of interest.

27. The method according to claim 11, wherein the step of deriving comprises:

estimating a probability that a measured spectral curve can be reproduced in the at least one medium among a database of known media;

identifying the at least one medium for which the probability is highest; and selecting the at least one scanner characterization profile associated with the medium for correcting the electronic image.

28. The method according to claim 11, wherein the step of deriving comprises building at least one scanner characterization profile from RGB-LAB pairs generated from performing the at least one color value measurement.

29. The method according to claim 28, wherein the step of building is accomplished with a neural network.

30. The method according to claim 28, wherein the step of building is accomplished with an iterative clustered interpolation.

31. The method according to claim 11, wherein the step of deriving comprises refining an existing scanner characterization profile with RGB-LAB pairs generated by performing the at least one color value measurement.

32. The method according to claim 31 wherein the step of refining is accomplished with Shepard's interpolation.

33. The method according to claim 31 wherein the step of refining is accomplished with distance-weighted linear regression.

34. The method according to claim 11, further comprising the step of applying a color transformation to the electronic image based on the scanner color correction to produce a color-corrected image.

* * * * *